United States Patent [19]
Miki et al.

[11] Patent Number: 6,157,787
[45] Date of Patent: *Dec. 5, 2000

[54] FILM FEEDING MECHANISM

[75] Inventors: Nobuya Miki, Moriguchi; Masaaki Chikasaki, Toyonaka, both of Japan; Yeou-Fu Hung, Taichung; Shih-Yuan Chen, Taichung, both of Taiwan

[73] Assignee: Minolta Co., Ltd, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/842,354

[22] Filed: Apr. 24, 1997

[30] Foreign Application Priority Data

Apr. 26, 1996  [JP]  Japan ..................................... 8-107382

[51] Int. Cl.⁷ ...................................................... G03B 1/00
[52] U.S. Cl. .......................... 396/395; 396/397; 396/411; 396/418
[58] Field of Search .................................... 396/395, 396, 396/397, 398, 399, 400, 403, 406, 407, 411, 418, 511, 512, 513, 514, 516

[56] References Cited

U.S. PATENT DOCUMENTS

| | | | |
|---|---|---|---|
| 3,486,431 | 12/1969 | Ettischer | 396/396 |
| 3,511,153 | 5/1970 | Steisslinger et al. | 396/397 |
| 5,585,877 | 12/1996 | Huang et al. | 396/399 |
| 5,628,040 | 5/1997 | Lee | 396/396 |
| 5,634,161 | 5/1997 | Huang et al. | 396/398 |
| 5,713,057 | 1/1998 | Williams et al. | 396/513 |

FOREIGN PATENT DOCUMENTS

7-319017  8/1995  Japan .

*Primary Examiner*—Eddie C. Lee
*Attorney, Agent, or Firm*—Burns, Doane, Swecker & Mathis, LLP

[57] ABSTRACT

In a mechanism for feeding a film, used in a camera, etc., in which a film having one perforation formed at a specified position relative to each frame or a film having a plurality of perforations formed at specified positions relative to each frame with unequal intervals therebetween as a whole is used, a sprocket 13 is employed for controlling to forward the film frame by frame. The sprocket is locked by a lever before an initial forwarding of the film is carried out, and it is unlocked from the lever when the film is forwarded to move the lever, so that the relationship of engagement between a tooth of the sprocket and the perforations of the film is ensured to be constant and synchronous during the initial feeding of the film.

22 Claims, 8 Drawing Sheets

FILM FEEDING MECHANISM

BACKGROUND OF THE INVENTION

1. Field of the Invention

The present invention relates to a film feeding mechanism, for a camera, an image reader or the like, which uses a film having one perforation formed at a specified location relative to each frame of the film, or uses a film having a plurality of perforations formed at specified locations relative to each frame thereof with unequal intervals therebetween as a whole.

2. Description of the Related Arts

In a conventional 35 mm film, eight perforations are formed for every frame along a longer side edge of the film. In cameras using this 35 mm film, generally, a sprocket having eight teeth to engage with the perforations of the film is employed, and the frame advance of the film is controlled by detecting one rotation of the sprocket during the film transport.

Also, there have been provided a camera in which the frame advance of the film is controlled by counting the eight perforations with a photo-interrupter.

Meanwhile, a film of a new standard in which one perforation is formed at a front end and a rear end respectively with respect to each frame of the film so that the perforations are arranged relative to each frame thereof with unequal intervals therebetween as a whole has been proposed. In case that such a film is used, an attempt to control the frame advance of the film by employing such a common sprocket as mentioned above could result in too complex a structure to be practical, even if possible. Thus, for cameras using this type of film, it is common practice to employ a photo-interrupter or other optical detector means to control the frame advance of the film.

The photo-interrupter system has a problem that not only the photo-interrupter itself is high-priced, but also accessory components such as a control circuit thereof are also costly, as compared with the sprocket system. To deal with this problem, Japanese Laid-Open Patent Publication No. 7-319017 has proposed a film feeding mechanism in which the film transport is controlled without employing a photo-interrupter but with a rotatable sprocket the rotation of which follows the film advance, as in the case where a 35 mm film is used. In the film transport system as disclosed in this publication, the sprocket has two teeth in correspondence to two perforations which are formed per frame of the film, and the sprocket is so arranged as to make one rotation while the film advances one frame, in which arrangement the frame advance of the film is controlled by detecting one rotation of the sprocket.

However, in this film feeding mechanism, because the sprocket is rotatable, there is a possibility that the positions of the teeth of the sprocket do not coincide with the positions of the perforations of the film during the film transport, especially during an initial stage at which the film is forwarded, resulting in an incorrect frame advance of the film.

Such a problem not only occurs to the aforementioned new standard film, but also may occur to those films in which perforations are not arranged uniformly with a short pitch therebetween, unlike 35 mm films, i.e., to other new standard films possibly proposed in future in which one perforation, or three or more perforations are formed per frame of the film.

SUMMARY OF THE INVENTION

Accordingly, it is an object of the present invention to provide a camera, or a film feeding mechanism, for the camera, etc. using a film in which one perforation is formed at a specified position relative to each frame, or using a film in which a plurality of perforations are formed at specified positions relative to each frame with unequal intervals therebetween as a whole, the film feeding mechanism preventing the camera from being high-priced by employing a sprocket to control the frame advance of the film and preventing the film feeding from malfunction due to a shift of rotational phase of the sprocket relative to the frame of the film.

In order to achieve the above object, the camera or the film feeding mechanism according to the present invention is characterized not only by employing a sprocket having the number of teeth equal to or smaller than the number of perforations formed relative to each frame, but also by establishing a constant or synchronous engagement relationship between the sprocket teeth and the perforations of the film during the initial forwarding of the film, which relationship is accomplished by controlling the rotational phase of the sprocket relative to the film during the initial forwarding of the film.

That is, the camera or the film feeding mechanism in which a length of film provided with one or more perforations at one or more predetermined locations relative to each frame thereof is used, comprises: a driving mechanism for feeding the film in a predetermined direction; a rotatable sprocket which has one engaging part able to engage the perforation of the film when the film is fed in the predetermined direction by the driving mechanism; and a rotation control mechanism which has selectively one of a first state in which the sprocket is stopped from rotating with the engaging part thereof being kept at a predetermined rotational phase while the film is being fed in the predetermined direction by the driving mechanism, and a second state in which the sprocket rotates while the film is being fed in the predetermined direction thereby.

The camera or the film feeding mechanism can use a film, for example, in which a plurality of perforations are formed relative to each frame thereof with unequal intervals between the adjacent perforations.

In the mechanism, it is preferable that the number of engaging part(s) of the sprocket is equal to or smaller than the number of perforation(s) relative to each frame of the film.

According to the mechanism, because the sprocket is used as a controlling mechanism for feeding the film frame by frame, an apparatus, such as a camera, etc. in which the film feeding mechanism is provided, can be manufactured at a low cost.

Also, according to the mechanism, it is possible to use means and mechanisms which are employed in the conventional film feeding mechanism for the 35 mm film, except the sprocket and rotation the control mechanism. Consequently, a low-priced apparatus in which the film feeding mechanism is provided can be realized.

Preferably, the sprocket may be driven by the riving mechanism. With the mechanism, it is ensured that the sprocket rotates, in accordance with the feeding of the film, with the engaging part or parts thereof engaging with the perforation or perforations of the film.

Preferably, there may be provided a clutch mechanism for sliding the sprocket. With the mechanism, for example, when the engaging part of the sprocket contacts a surface of the film instead of engaging the perforation of the film and there arises a greater rotational load being exerted upon the sprocket, any malfunction of the mechanism caused thereby can be surely prevented by the sprocket sliding.

The mechanism can further comprise a locking mechanism by which the sprocket is stopped from rotating when the rotation control mechanism has the first state.

In the mechanism, preferably, the rotation control mechanism may have the first state until a leading edge of the film passes a predetermined position relative to the sprocket at time of forwarding the film; and the rotation control mechanism may have the second state after the leading edge thereof passes the predetermined position relative thereto at time thereof. According to the mechanism, until the leading edge of the film passes the predetermined position, the sprocket is stopped from rotating by the rotation control mechanism; and after the film passes the predetermined position, the sprocket rotates. This ensures a precisely synchronous engagement between the engaging part or parts of the sprocket and the perforation or perforations of the film, when the film is forwarded, for example, from a film cartridge in which the film is housed. In other words, according to the mechanism, it is possible to forward the film frame by frame with an accuracy, and it is possible to prevent misengaging the engaging part(s) of the sprocket with the perforation(s) of the film.

In case that the camera or the film feeding mechanism comprises the locking mechanism as described above, for example, the locking mechanism may comprise: a first locking part which is formed on the sprocket; and a locking member which has a second locking part which can lock the first locking part of the sprocket and which has a follower, positioned at a location at which the follower crosses a path along which the film is fed, that is so driven by the leading edge of the film that the first locking part of the sprocket is unlocked from the second locking part of the locking member. In the construction, the sprocket is locked at the initial rotational phase until the leading edge of the film drives or contacts the follower of the locking member; and the first locking part of the sprocket is unlocked from the second locking part of the locking member after the leading edge of the film drives or contacts the follower of the locking member at time of forwarding the film. That is, according to the mechanism, because the locking mechanism comprises economical and simple mechanical members, a low production cost of the apparatus in which the film feeding mechanism is provided, is surely realized.

Preferably, there may be provided a detector for detecting an amount of rotation of the sprocket, and a controller for controlling an operation of the driving mechanism on a basis of a result that is detected by the detector, wherein the controller controls the operation of the driving mechanism so that the feeding of the film is stopped every time the detector detects one rotation of the sprocket. With the mechanism, it is ensured that the film is fed frame by frame accurately.

BRIEF DESCRIPTION OF THE DRAWINGS

This and other objects and features of the present invention will become clear from the following description taken in conjunction with the preferred embodiment thereof with reference to the accompanying drawings, in which.

DETAILED DESCRIPTION OF THE INVENTION

An embodiment of a film feeding mechanism, according to the present invention, which applies to a camera, is described below in detail with reference to FIGS. 1 to 10.

Figure 1:
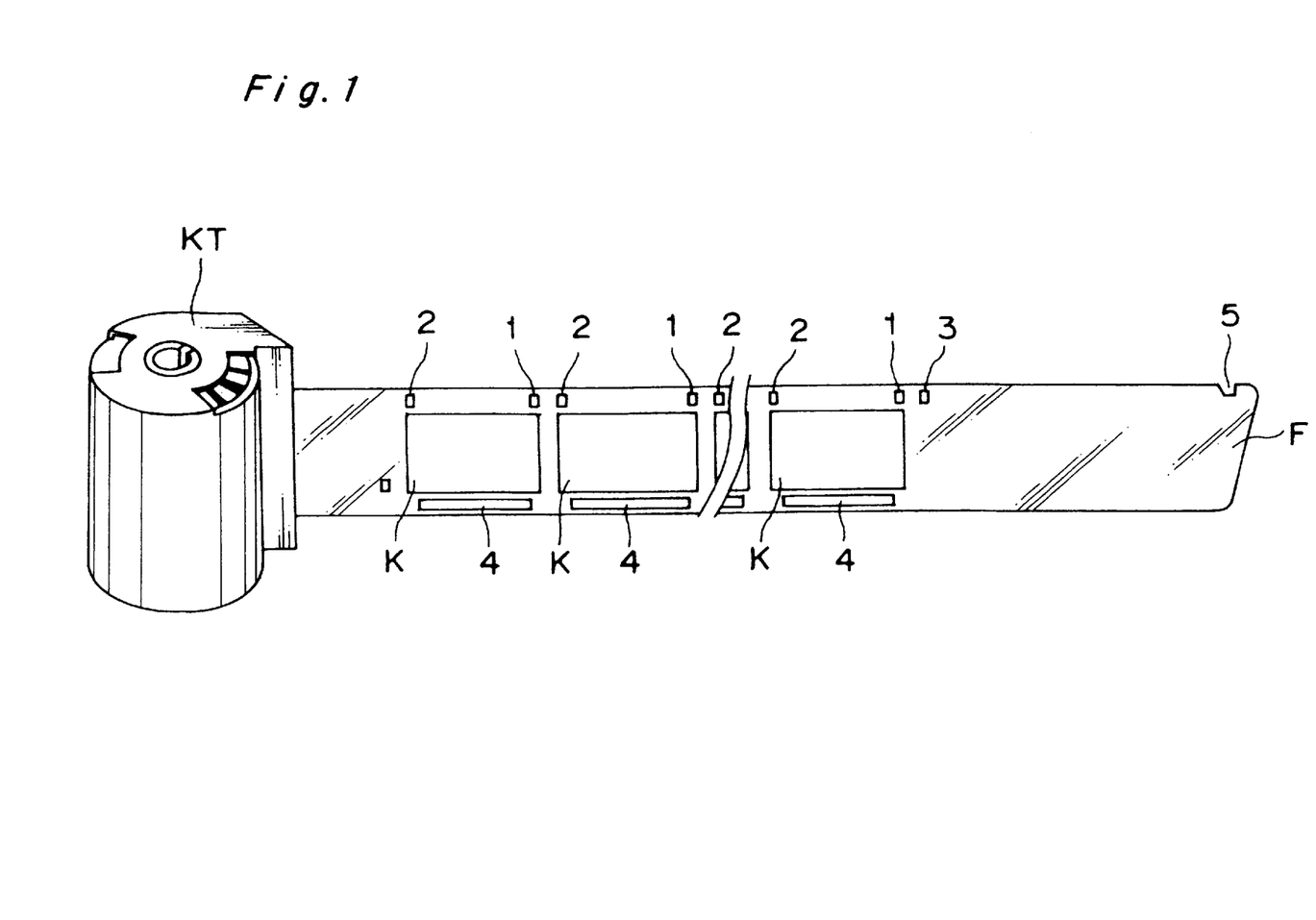
FIG. 1 is a perspective view of a film cartridge which is used in a film feeding mechanism for a camera according to the present invention.

Referring first to FIG. 1, a film cartridge used in this camera is explained. In the figure, a reference character KT denotes the film cartridge, F denotes a film thereof, and K denotes each frame thereof. Along one longer side edge of the film F, perforations 1 and 2 are formed at front and rear end positions to each frame K, and one perforation 3 is formed on a side of its film leading edge relative to the perforation 1 located on the most front end of its leading frame.

Below each frame K, a magnetic recording surface 4 for data recording is formed so that some data of information on photographing can be magnetically recorded. It is noted that a notch 5 is formed at a front end portion, i.e. a film leader, of the same longer side edge of the film F as that along which the perforations 1, 2 and 3 are formed.

Figure 2:
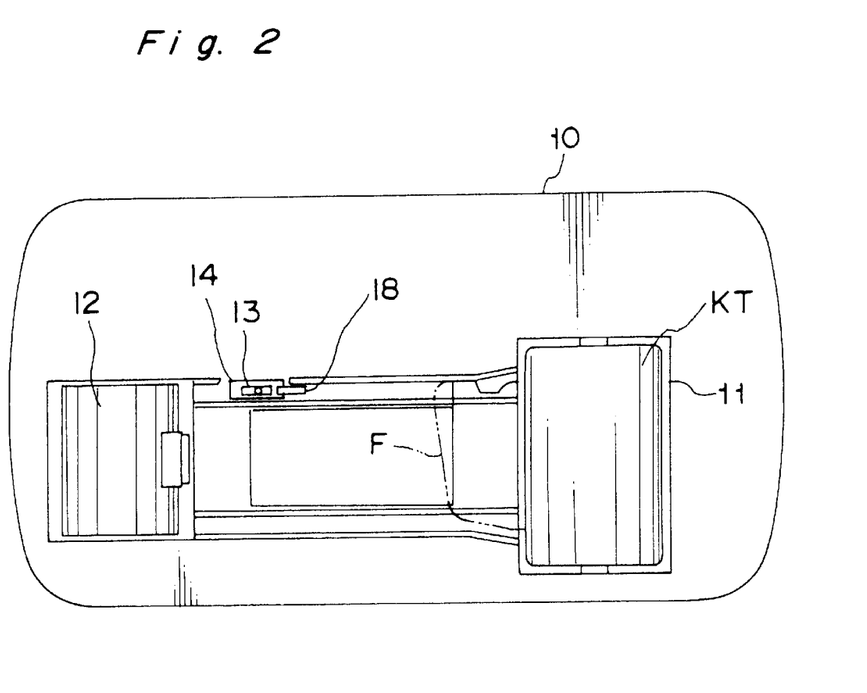
FIG. 2 is a rear side view outlining the arrangement of the interior of this camera.
Figure 3:
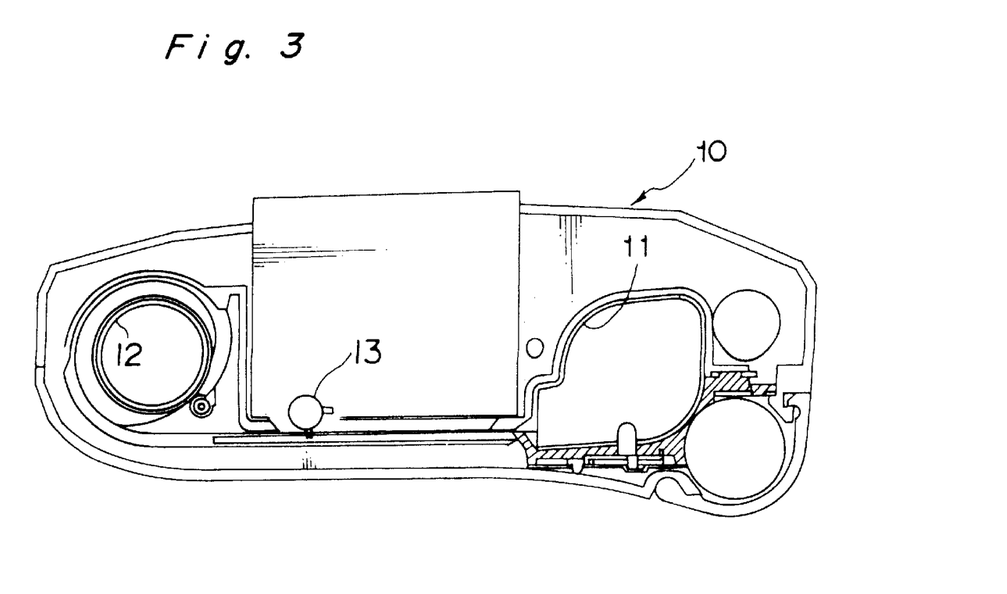
FIG. 3 is a central transverse sectional view of FIG. 2.

FIG. 2 is a rear side view outlining the arrangement of the interior of this camera 10, and FIG. 3 is a central transverse sectional view of FIG. 2. Designated by a numeral 11 is a cartridge chamber for accommodating the cartridge KT, and a film wind-up spool 12 for winding up the film F is provided on the opposite side of the cartridge chamber 11 with respect to the exposure position.

A sprocket 13 is disposed on the track along which the perforations 1, 2 and 3 run when the film F is wound up around the film wind-up spool 12. The sprocket 13 is located within a sprocket window 14 formed in the body frame.

Figure 4:
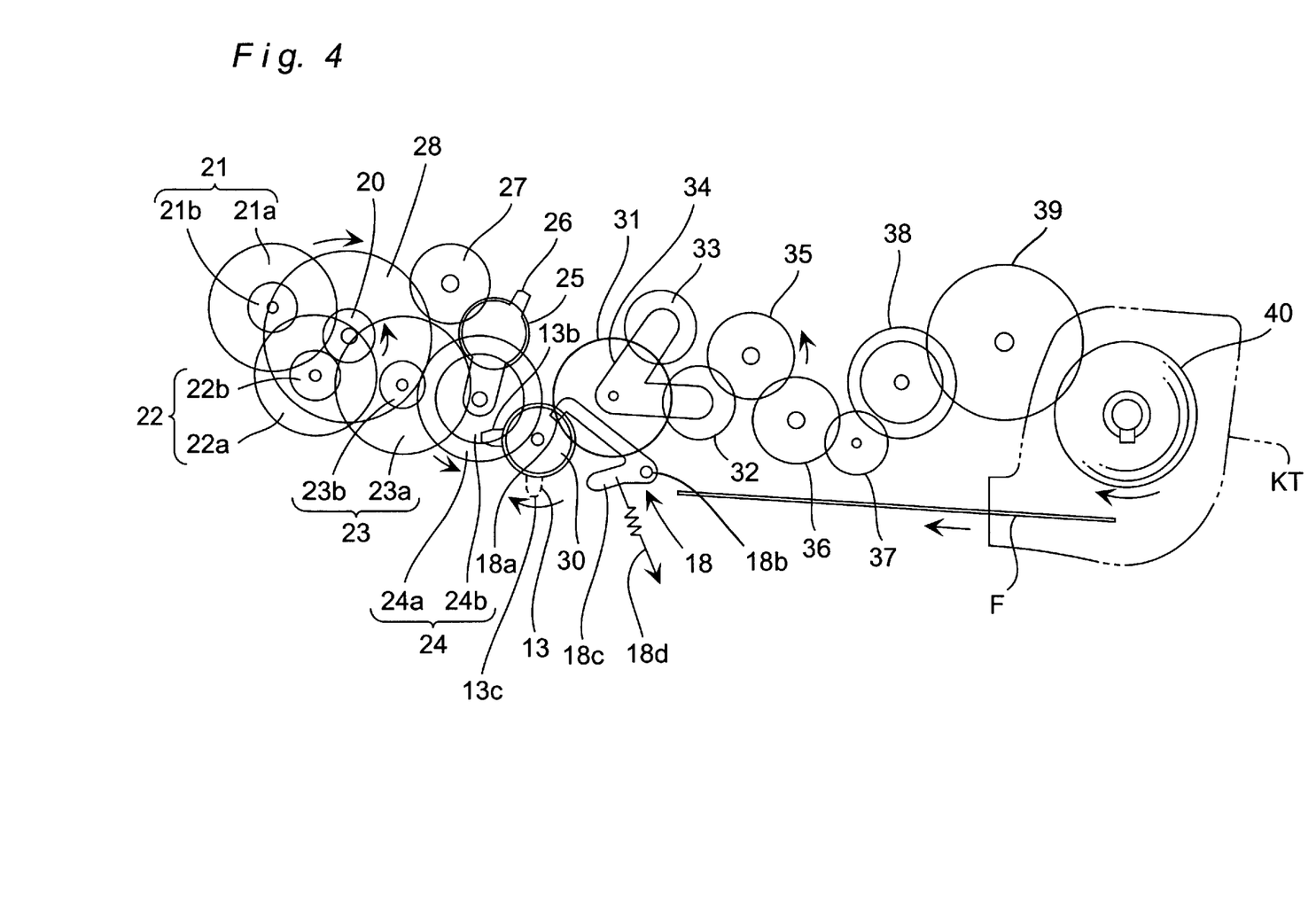
FIG. 4 is a plan view showing a gear array used in the film feeding mechanism, showing a locking state of a sprocket.

Next, a driving mechanism for transporting the film F from the cartridge KT to the film wind-up spool 12 is explained with reference to FIG. 4. FIG. 4 shows a gear array for transferring a driving force from a film-transporting motor (refer to FIG. 10) to the cartridge KT and the film wind-up spool. In the figure, each gear is expressed only by a tooth-tip circle in solid line for simplicity. Also, the gears and the other members are shown all in solid line, including overlapping part, irrespectively of whether the members are positioned up or down relative to one another.

In the figure, a reference numeral 20 denotes a drive gear which is fixed to an output shaft of the film-transporting motor used as a drive source. This drive gear 20 is engaged with a plurality of gears 21, 22, 23 and 24 in sequence. These gears 21, 22, 23, 24 are integrally comprised of large-diameter gears 21a, 22a, 23a and 24a and small-diameter gears 21b, 22b, 23b and 24b, respectively, and constitute a speed-reduction gear array as a whole.

The small-diameter gear 24*b* of the gear 24 is engaged with a planetary gear 25. The planetary gear 25 is rotatably retained at an end portion of an arm 26 which is swingable about the rotational center of the gear 24. The arm 26 is frictionally coupled with the gear 24 so as to swing leftward or rightward depending on the rotational direction of the gear 24. A gear 27 is disposed so as to engage with the planetary gear 25 (refer to the illustrated state in FIG. 4) when the arm 26 swings counterclockwise about the rotational center of the gear 24. A spool driving gear 28 which engages with the gear 27 is disposed concentrically with the drive gear 20. The spool driving gear 28, although disposed concentrically with the drive gear 20, can rotate independently of the drive gear 20 in terms of its rotational directivity.

Meanwhile, a gear 30 which engages with the gear 24 is disposed concentrically with respect to a sprocket 13. The gear 30 is engaged with a gear 31, and the gear 31 is engaged with a pair of planetary gears 32 and 33. The planetary gears 32 and 33 are swingable about the rotational center of the gear 31, and are retained by a V-shaped arm 34 that is frictionally coupled with respect to the gear 31. Therefore, depending on the direction in which the gear 31 rotates, the arm 34 rotates clockwise or counterclockwise.

A gear 35 is disposed so as to be engaged with the planetary gear 32 or 33, depending on the direction in which the gear 31 rotates. The gear 35 is linked with a forwarding/unwinding gear 40 via gears 36, 37, a reduction gear 38 and a gear 39. The forwarding/unwinding gear 40 is so formed as to rotate integrally with a key that engages with a spool shaft of the cartridge KT, so that the film F is forwarded or rewound depending on the rotational direction thereof.

Figure 5:
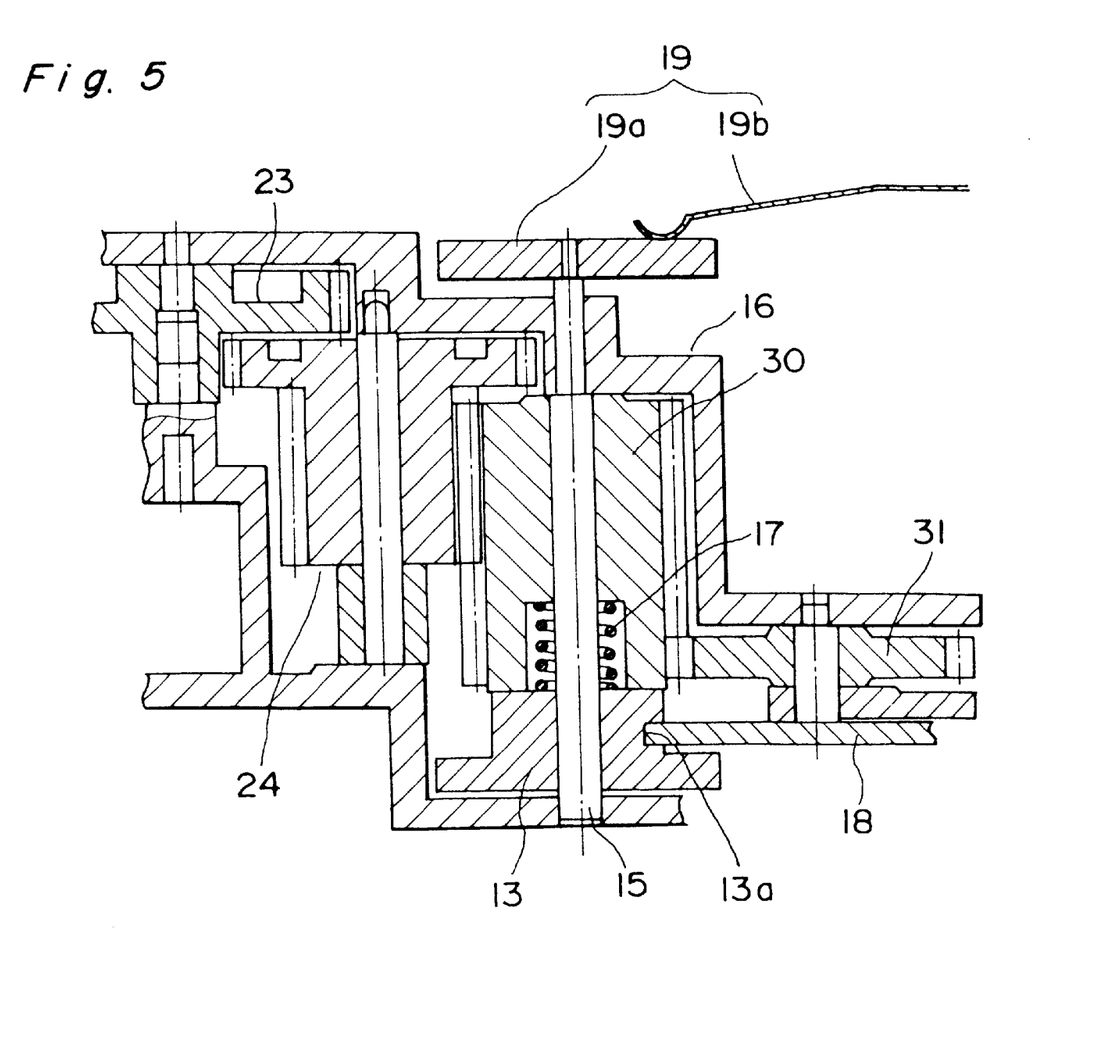
FIG. 5 is an enlarged sectional view showing the arrangement of the sprocket and a gear which is concentric therewith.

Next, the arrangement or construction of the sprocket 13 and the gear 30 is explained with reference to FIG. 5. FIG. 5 shows only an engaging state in which the gears 23, 24, 30 and 31 engage one after another. The sprocket 13 is fixed to a shaft 15, and the gear 30 is rotatably supported by the shaft 15. The shaft 15 is rotatably supported by a body frame 16 of the camera. Between the sprocket 13 and the gear 30, is provided a spring 17 as a clutch mechanism, so that the gear 30 and the sprocket 13 rotate integrally with each other unless the sprocket 13 is under a rotational load, but that the sprocket 13 slides relative to the gear 30 if a relatively large rotational load is exerted upon the sprocket 13.

Designated by a reference numeral 18 is a lever as a rotation control member with an engaging portion 18*a* as rotation restricting means (see FIG. 4) which engages with a recess 13*a* formed on the outer peripheral surface of a boss of the sprocket 13 so as to lock the sprocket 13.

The lever 18 is swingable about a pin 18*b* provided in an immediate front of a plane along which the film F passes, and is urged by a spring 18*d* toward such a direction that the engaging portion 18*a* is engaged with the recess 13*a*. The lever 18 has an unlocking portion 18*c* as unlocking means which is slightly protruded rearward across the plane along which the film F passes in the state that the lever 18 is pulled by the spring 18*d* backward of the plane, and which releases the locking of the sprocket 13 by the engaging portion 18*a* when the film F passes the unlocking portion 18*c*. The sprocket 13 is normally positioned in its initial phase, as illustrated in the figure, in the state prior to the initial forwarding of the film in which the locking has not been released.

Figure 10:
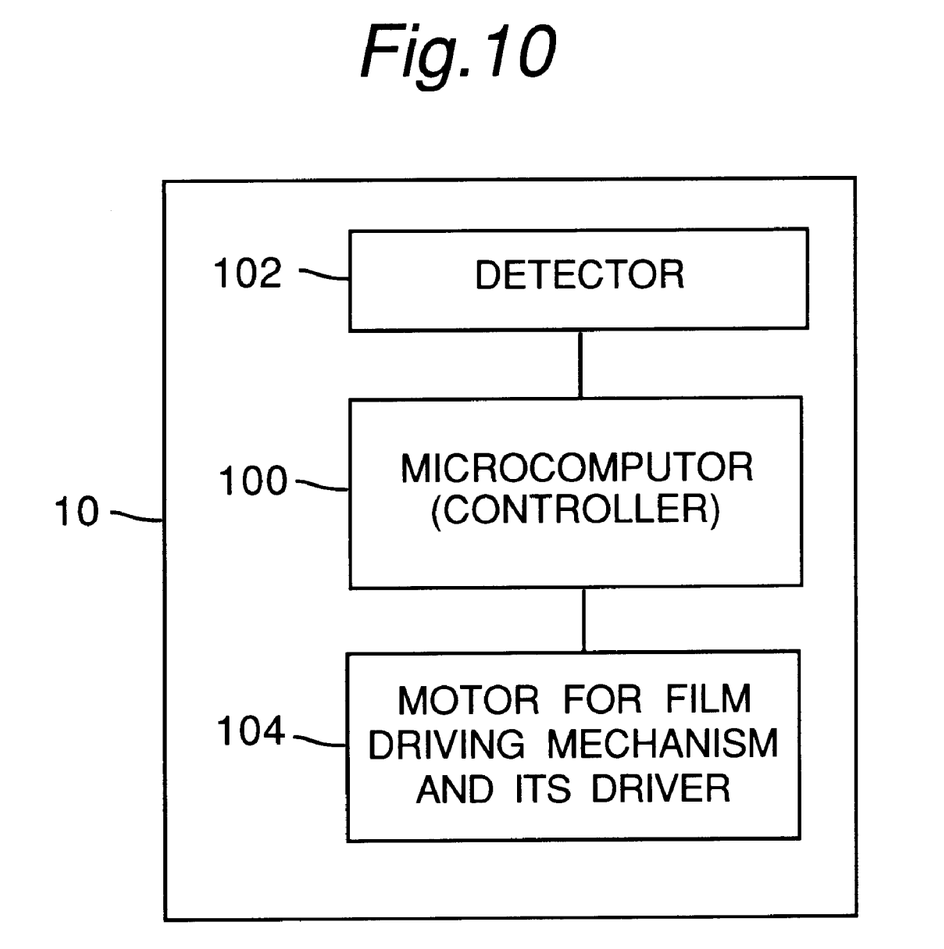
FIG. 10 is a block diagram showing a control system of the camera in which the film feeding mechanism is providing.

On an opposite end portion of the shaft 15 fixed with the sprocket 13, is provided a detection means 19 for detecting one rotation of the sprocket 13 with a microcomputer (refer to FIG. 10) provided as a camera control means or controller. The detection means 19 comprises a detector plate 19*a* fixed to the shaft 15, and a contact piece 19*b* fixed on the body frame 16. A detection pattern (not shown) for detecting one rotation of the sprocket 13 is provided on the top surface of the detector plate 19*a*, enabling a detector circuit to be closed every one rotation so that the microcomputer can detect the rotation. The detection pattern itself can be a pattern that has been conventionally used for 35 mm films to detect the rotation of the sprocket, as it is. By the way, FIG. 10 shows a block diagram of the camera in which the film feeding mechanism is provided. A reference numeral 100 points to the microcomputer (controller) of the camera; 102 to a detector corresponding to the detecting means 19; and 104 to the motor for driving the drive gear 20 and a driven for actuating the motor.

With the above mechanism, in case of forwarding the film F, the motor is started up so that the drive gear 20 rotates counterclockwise, as shown in FIG. 4. This rotation is transmitted to the gear 24 via the gears 21, 22 and 23, causing the gear 24 to rotate counterclockwise. As a result of this rotation of the gear 24, the planetary gear 25 is engaged with the gear 27, so that the rotation is further transmitted to the gear 28. Thus, the spool gear 28 rotates clockwise, i.e., in a direction in which the film F is wound up around the spool.

Meanwhile, the rotation of the gear 24 is transmitted also to the gear 30, but the sprocket 13 is locked by the lever 18 so as not to rotate. That is, the sprocket 13 is kept in the initial phase. Also in this case, the gear 31 rotates counterclockwise, so that the planetary gear 32 is engaged with the gear 35 so as to rotate counterclockwise. Therefore, the rotation is further transmitted to the forwarding/unwinding gear 40 via the gears 36, 37, 38 and 39, causing the gear 40 to rotate clockwise, i.e., in such a direction that the film F is pushed out of the cartridge KT.

With the motor further rotating, the film F advances with its front end passing the unlocking portion 18*c* of the lever 18. Then, the lever 18 swings a little clockwise about the pin 18*b* against the urging force of the spring 18*d*, so that the engaging portion 18*a* is disengaged from the engaging recess 13*a* of the sprocket 13, and the sprocket 13 starts rotating at the same time. Whereas the front end of the film F further goes ahead leftward in the figure, the sprocket 13 rotates at the same time so that a tooth 13*c* of the sprocket 13 does not contact with the front-end edge (i.e. the leading edge) of the film F, and the tooth 13*b* contacts with the film F when the sprocket 13 rotates to the position of FIG. 6. At this point, the notch 5 at the film leader that passes a region overlapping with the path of the perforations 1, 2 and 3 has already passed over the position of the tooth 13*b* of the sprocket 13; thus, the notch 5 does not engage the tooth 13*b* or 13*c*.

Figure 6:
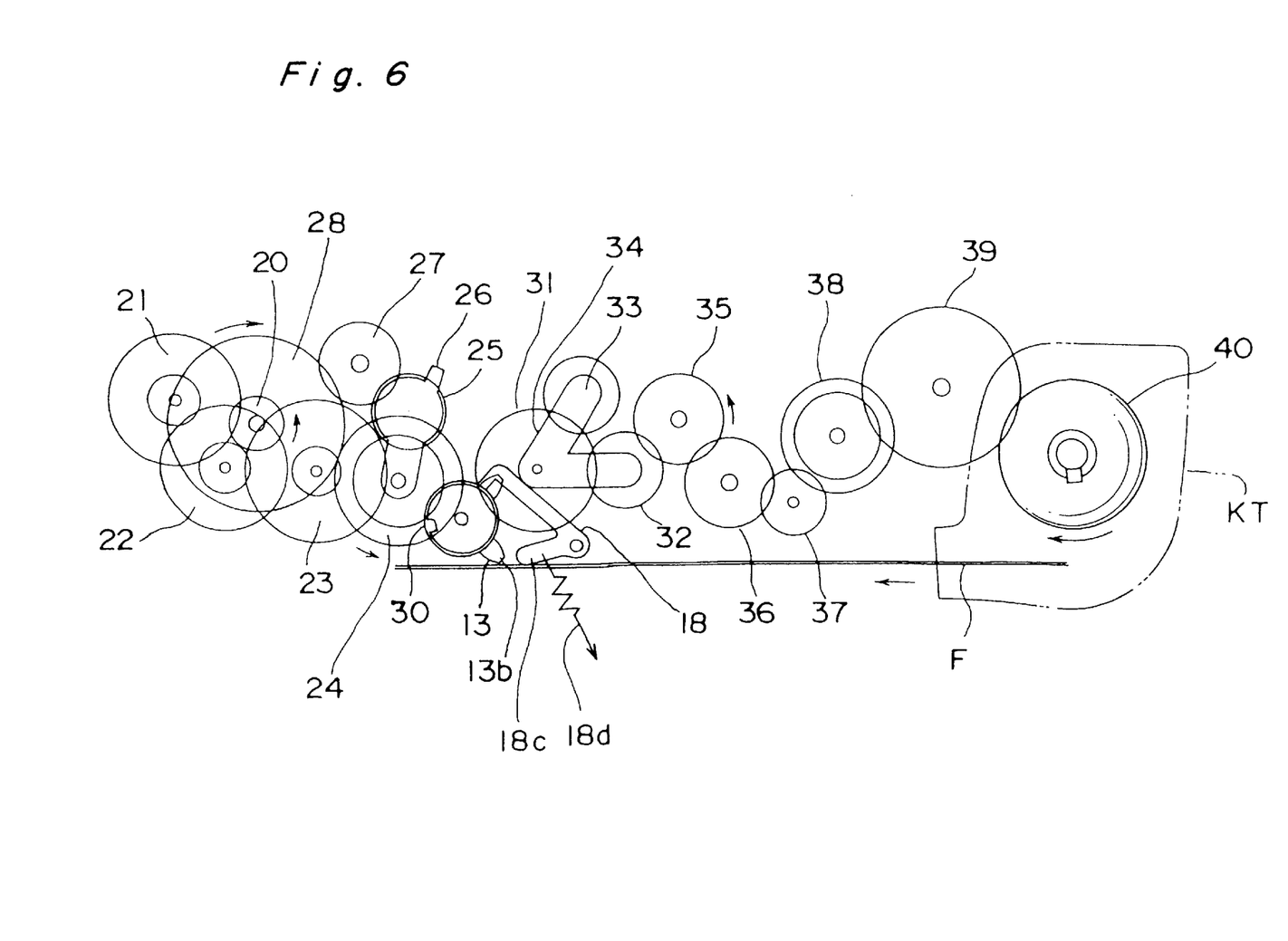
FIG. 6 is a plan view showing the gear array used in the film feeding mechanism, showing an unlocking state of the sprocket.
Figure 7:
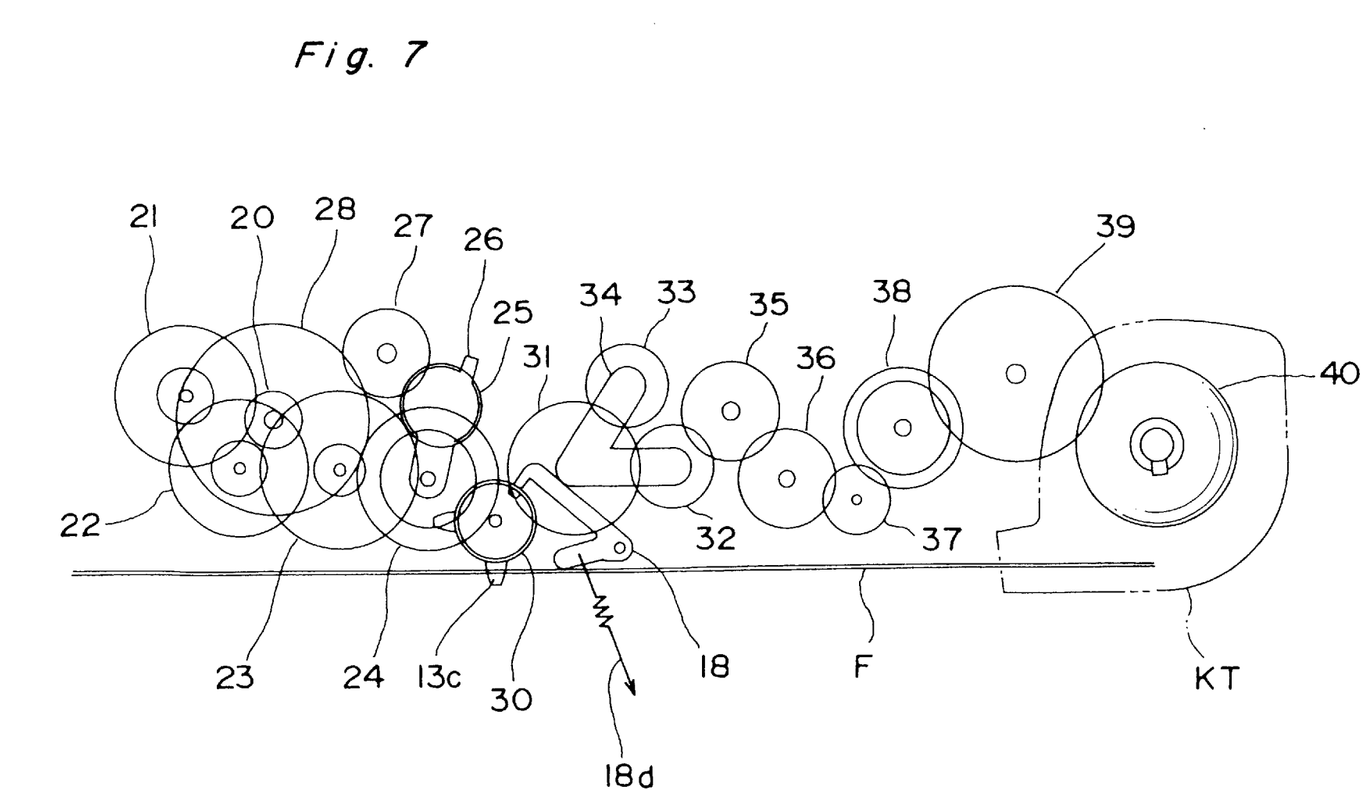
FIG. 7 is a plan view showing the gear array used in the film feeding mechanism, showing a state in which the frame forwarding of the film has been completed.

With the film transport further continuing, since the tooth 13*b* is in contact with the film F, the sprocket 13 does not rotate for a while and remains in the stopped state shown by FIG. 6. Then, when the first perforation 3 comes, the tooth 13*b* enters thereinto so that the sprocket 13 rotates a little. Further, when the next perforation 1 comes, the tooth 13*c* enters thereinto, resulting in the state of FIG. 7. At this point, the operation that the sprocket 13 has made just one rotation from the initial phase is detected by the detector 102 and the microcomputer 100 via the detection means 19 provided at the end of the shaft 15, and the motor 104 is stopped so that the film feeding is stopped. With the above steps, the initial transport or feeding of the film F is ended with the first frame of the film being positioned relative to an aperture of the camera.

Thereafter, for transporting the film F frame by frame, the motor is rotated in the same direction as that in the initial transport, by which the spool gear 28 and the forwarding/unwinding gear 40 are rotated clockwise, respectively. Then, the tooth 13c comes out of the perforation 1 along with the film forwarding motion, and the sprocket 13 rotates clockwise up to the position of FIG. 6. After that, the motor 104 stops when the sprocket 13 comes again to the state of FIG. 7, as in the initial transport or feeding of the film F, thus finishing the forwarding transport of the film F by one frame.

On the other hand, in case of feeding or transporting the film F in the reverse direction, the motor is rotated in the direction reverse to that in the above case, by which the spool gear 28 and the forwarding/unwinding gear 40 are rotated counterclockwise so that the film F is fed back rightward in the figure. In this case, after taking an operation that the tooth 13c comes out of the perforation 1 along with the film motion and that the tooth 13b engages with and disengages from the perforation 2, the sprocket 13 rotates counterclockwise until the tooth 13c comes into contact with the film F.

With the sprocket 13 stopped rotating for a while with the tooth 13c thereof contacting the film F, the film F is fed back on. When the tooth 13c thereof engages with the perforation 1, the operation that the film F has been reversely transported by one frame is detected.

That is, the mechanism of the present invention can also be applied to a prewinding type of camera in which the film is once fully wound up around the spool of the camera and then rewound into the cartridge frame by frame. By the way, in case that the camera is of a type with an ordinary winding system, the control program can be a program by which the frame-by-frame detection is skipped.

Figure 8:
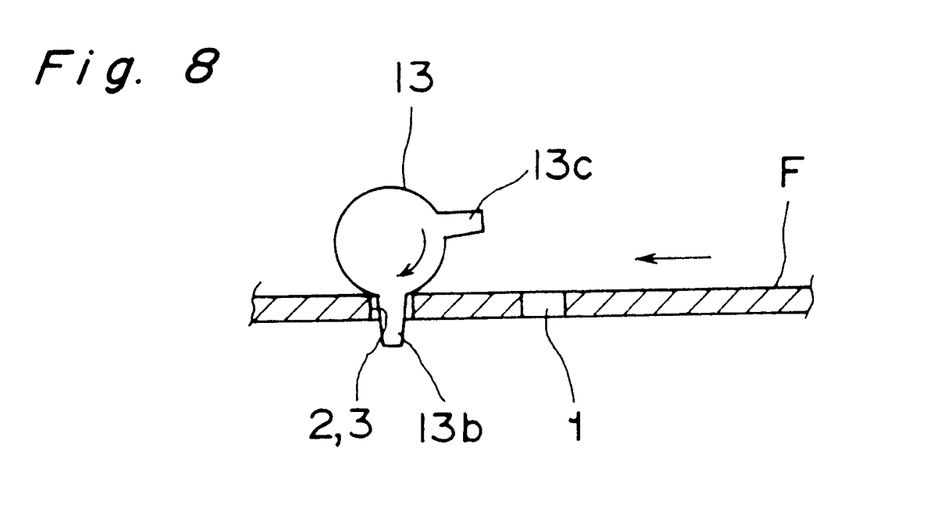
FIG. 8 is a partially sectional view showing an engaging state between the sprocket and a perforation.

As described hereinbefore, according to the mechanism, before the initial transport of the film F from the cartridge KT to the film wind-up spool 12, the sprocket 13 is locked in the initial phase by the engaging portion 18a of the lever 18 provided as rotation restricting means, and the sprocket 13 is not unlocked until the film F passes the unlocking portion 18c of the lever 18. This arrangement ensures a precise engagement of the tooth 13b of the sprocket 13 with the perforation 2 or 3 as shown in FIG. 8, and a positive engagement of the tooth 13c with the perforation 1, enabling a correct frame-feeding of the film F to be carried out.

Figure 9:
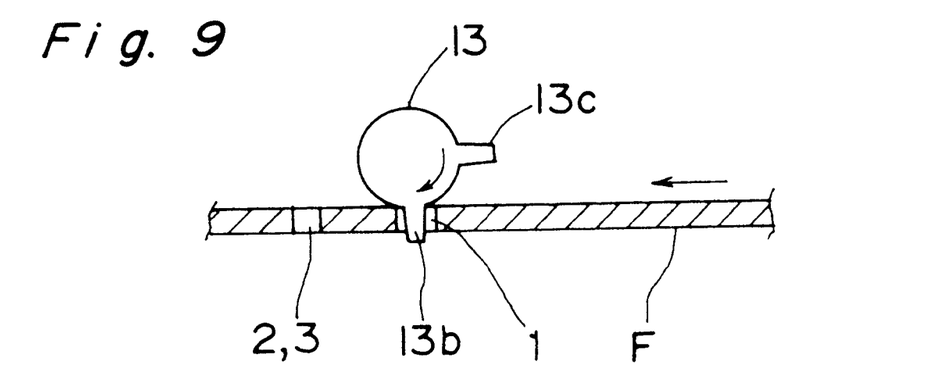
FIG. 9 is a partially sectional view showing an engaging state between the sprocket and a perforation.

By the way, given no such means as controlling the rotation of the sprocket 13 as explained above, the tooth 13b may be possibly engaged with the perforation 1 as shown in FIG. 9, causing the film F not to be advanced or fed correctly frame by frame.

As described above, according to the mechanism, not only the sprocket 13 that has the same number of teeth 13b and 13c as the number of perforations relative to each frame is used, but also the rotational phase of the sprocket 13 at time of initial transport of the film F is controlled by the lever 18 that is linked with the film transport. As a result, the film F can be transported frame by frame correctly and accurately despite the simple mechanism.

Further, according to the mechanism, because the rotational control of the sprocket 13 is implemented with components thus simply constructed, the camera can be manufactured at low cost.

By the way, according to the conventional film feeding mechanism for cameras using this type of film, the frame detection of the film F is implemented electrically by using a photo-interrupter, so that the number of frames of the film F is displayed by an electrical counter using a liquid crystal display, or the like, or is otherwise displayed by a mechanical counter after converting the electrical signal of the photo-interrupter into mechanical movement or operation. However, according to the present invention, the number of frames of the film F is displayed mechanically with the mechanism in which the shaft 15 is directly connected to the mechanical counter. From this point of view also, the camera can be reduced in cost.

The film feeding mechanism of the present invention is shown as one that is applied to the new-standard film having two perforations relative to each frame. However, the film feeding mechanism is also applicable to a film in which one perforation is formed at a specified position relative to each frame, or to a film, possibly used in the future, in which three or more perforations are formed at specified positions relative to each frame with unequal intervals therebetween as a whole, by matching the number and positions of the teeth of the sprocket 13 to the number and positions of the perforations relative to each frame K.

Moreover, although the sprocket having two teeth has been employed for the film having two perforations relative to each frame, i.e. although the number of teeth of the sprocket is equal to the number of perforations of the film, in the above embodiment, it is also possible to employ a sprocket having the number of teeth smaller than that of perforations. For instance, the tooth 13c in FIG. 4 is shown with dotted lines to indicate that it can be eliminated. In case that the sprocket is so constructed relative to the film, the teeth of the sprocket can be prevented from engaging with the notch provided at the film leader by synchronizing the rotational phase of the sprocket with respect to a position of the film leading edge.

Although the present invention has been fully described in connection with the preferred embodiment thereof with reference to the accompanying drawings, it is to be noted that various other changes and modifications are apparent to those skilled in the art. Such changes and modifications are to be understood as included within the scope of the present invention as defined by the appended claims unless they depart therefrom.

What is claimed is:

1. A film feeding mechanism which feeds a length of film provided with one or more perforations at one or more predetermined locations relative to each frame thereof, comprising:

a driving mechanism for feeding the film in a predetermined direction;

a rotatable sprocket which has an engaging part that is able to engage the perforation of the film when the film is fed in the direction by the driving mechanism; and a rotation control mechanism which has a first state in which the sprocket is stopped from rotating with the sprocket being fixed at a predetermined rotational phase for a span of film advancement before the film has reached said sprocket, wherein the rotation control mechanism always maintains the sprocket in the same predetermined rotational phase every time a film is being advanced by the driving mechanism before the film reaches the sprocket.

2. The film feeding mechanism as claimed in claim 1, wherein the rotation control mechanism comprises a locking mechanism by which the sprocket is stopped from rotating when the rotation control mechanism has the first state.

3. The film feeding mechanism as claimed in claim 2, wherein the locking mechanism of the rotation control mechanism comprises:

a first locking part which is formed on the sprocket; and a locking member which has a second locking part which can lock the first locking part of the sprocket and which has a follower that is so driven by a leading edge of the film that the first locking part of the sprocket is unlocked from the second locking part of the locking member.

4. The film feeding mechanism as claimed in claim 3, wherein the locking member comprises a lever which is released from engagement with said first locking part when said follower is driven by said leading edge of the film.

5. The film feeding mechanism as claimed in claim 1, further comprising a detector for detecting an amount of rotation of the sprocket.

6. The film feeding mechanism as claimed in claim 1, wherein a position of said rotation control mechanism changes during film advancement.

7. A film feeding mechanism which feeds a length of film provided with one or more perforations at one or more predetermined locations relative to each frame thereof, comprising:

a driving mechanism for feeding the film in a predetermined direction;

a rotatable sprocket which has an engaging part able to engage the perforation of the film when the film is fed in the direction by the driving mechanism; and a rotation control mechanism which has a first state in which the sprocket is stopped from rotating with the engaging part thereof being kept at a predetermined rotational phase for a span of film advancement before the film has reached said sprocket;

wherein the rotation control mechanism has the first state until a leading edge of the film passes a predetermined position relative to the sprocket at time of forwarding the film, and wherein the rotation control mechanism has the second state after the leading edge thereof passes the predetermined position relative thereto at time thereof.

8. A film feeding mechanism which feeds a length of film provided with a plurality of perforations at a plurality of predetermined locations relative to each frame thereof, comprising:

a driving mechanism for feeding the film in a predetermined direction;

a rotatable sprocket which has a plurality of engaging parts that are able to engage the perforations of the film when the film is fed in the direction by the driving mechanism, wherein the number of engaging parts of the sprocket is equal to or smaller than the number of perforations relative to each frame of the film; and a rotation control mechanism which has a first state in which the sprocket is stopped from rotating with the sprocket being kept fixed at a predetermined rotational phase for a span of film advancement before the film has reached said sprocket, wherein the rotation control mechanism always maintains the sprocket in the same predetermined rotational phase every time a film is being advanced by the driving mechanism before the film reaches the sprocket.

9. The film feeding mechanism as claimed in claim 8, wherein a position of said rotation control mechanism changes during film advancement.

10. A camera which feeds a length of film provided with one or more perforations at one or more predetermined locations relative to each frame thereof, comprising:

a driving mechanism for feeding the film in a predetermined direction;

a rotatable sprocket which has an engaging part that is able to engage the perforation of the film when the film is fed in the direction by the driving mechanism;

a rotation control mechanism which has a first state in which the sprocket is stopped from rotating with the sprocket being kept fixed at a predetermined rotational phase for a span of film advancement before the film has reached said sprocket, wherein the rotation control mechanism always maintains the sprocket in the same predetermined rotational phase every time a film is being advanced by the driving mechanism before the film reaches the sprocket;

a detector for detecting an amount of rotation of the sprocket; and a controller for controlling an operation of the driving mechanism on the basis of a result which is detected by the detector.

11. The camera as claimed in claim 10, wherein said rotation control mechanism comprises a locking mechanism by which the sprocket is stopped from rotating when the rotation control mechanism has the first state.

12. The camera as claimed in claim 11, wherein the locking mechanism of the rotation control mechanism comprises:

a first locking part which is formed on the sprocket; and a locking member which has a second locking part which can lock the first locking part of the sprocket and which as a follower that is so driven by a leading edge of the film that the first locking part of the sprocket is unlocked from the second locking part of the locking member.

13. The camera as claimed in claim 12, wherein the locking member comprises a lever which is released from engagement with said first locking part when said follower is driven by said leading edge of the film.

14. The camera as claimed in claim 10, wherein the rotation control mechanism has the first state until a leading edge of the film passes a predetermined position relative to the sprocket when the film is forwarded, and wherein the rotation control mechanism has a second state after the leading edge thereof passes the predetermined position, wherein, in the second state, the sprocket rotates while the film is being fed in the direction.

15. The camera as claimed in claim 10, wherein the controller controls the operation of the driving mechanism so that the feeding of the film is stopped every time the detector detects one rotation of the sprocket.

16. The camera as claimed in claim 10, wherein a position of said rotation control mechanism changes during film advancement.

17. A camera which feeds a length of film provided with a plurality of perforations at a plurality of predetermined locations relative to each frame thereof, comprising:

a driving mechanism for feeding the film in a predetermined direction;

a rotatable sprocket which has a plurality of engaging parts that are able to engage the perforations of the film when the film is fed in the direction by the driving mechanism, wherein the number of engaging parts of the sprocket is equal to or smaller than the number of perforations relative to each frame of the film;

a rotation control mechanism which has a first state in which the sprocket is stopped from rotating with the sprocket being kept fixed at a predetermined rotational phase for a span of film advancement before the film has reached said sprocket, wherein the rotation control mechanism always maintains the sprocket in the same predetermined rotational phase every time a film is being advanced by the driving mechanism before the film reaches the sprocket;

a detector for detecting an amount of rotation of the sprocket; and a controller for controlling an operation of the driving mechanism on a basis of a result which is detected by the detector.

18. The camera as claimed in claim 17, wherein a position of said rotation control mechanism changes during film advancement.

19. A film feeding mechanism which feeds a length of film provided with one or more perforations at one or more predetermined locations relative to each frame thereof, comprising:

a driving mechanism for feeding the film in a predetermined direction;

a rotatable sprocket which has an engaging part able to engage the perforation of the film when the film is fed in the direction by the driving mechanism; and means for locking the sprocket at a predetermined rotational phase for a span of film advancement before the film has reached said sprocket.

20. The film feeding mechanism as claimed in claim 19, wherein a position of said locking means changes during film advancement.

21. A film feeding mechanism which feeds a length of film provided with a plurality of perforations at a plurality of predetermined locations relative to each frame thereof, comprising:

a driving mechanism for feeding the film in a predetermined direction;

a rotatable sprocket which has a plurality of engaging parts that are able to engage the perforations of the film when the film is fed in the direction by the driving mechanism, wherein the number of engaging parts of the sprocket is equal to or smaller than the number of perforations relative to each frame of the film; and means for locking the sprocket at a predetermined rotational phase for a span of film advancement before the film has reached said sprocket.

22. The film feeding mechanism as claimed in claim 21, wherein a position of said rotation control mechanism changes during film advancement.

* * * * *

UNITED STATES PATENT AND TRADEMARK OFFICE
CERTIFICATE OF CORRECTION

PATENT NO. : 6,157,787
DATED : December 5, 2000
INVENTOR(S) : N. Miki et al.

It is certified that error appears in the above-identified patent and that said Letters Patent is hereby corrected as shown below:

<u>Title page,</u>
The following Assignee is added:
-- [73] Assignee: Sinpo Optical Co., Ltd., Taiwan, Republic of China --

Signed and Sealed this

Twenty-third Day of April, 2002

Attest:

Attesting Officer

JAMES E. ROGAN
*Director of the United States Patent and Trademark Office*